(12) United States Patent
Kuhlmann et al.

(10) Patent No.: US 7,534,971 B2
(45) Date of Patent: May 19, 2009

(54) WEIGHING SYSTEM OF MONOLITHIC CONSTRUCTION INCLUDING FLEXURAL PIVOT

(75) Inventors: Otto Kuhlmann, Goettingen (DE);
Peter Fleischer, Goettingen (DE);
Friedrich Helmsen, Goettingen (DE);
Thomas Fehling, Witzenhausen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 11/882,798

(22) Filed: Aug. 6, 2007

(65) Prior Publication Data

US 2008/0029315 A1    Feb. 7, 2008

Related U.S. Application Data

(63) Continuation of application No. PCT/EP2006/000831, filed on Feb. 1, 2006.

(30) Foreign Application Priority Data

Feb. 5, 2005    (DE) .......................... 10 2005 005 369

(51) Int. Cl.
*G01G 3/12*    (2006.01)
*G01G 7/00*    (2006.01)

(52) U.S. Cl. .............................. 177/210 EM; 177/212; 177/229

(58) Field of Classification Search .......... 177/210 EM, 177/212, 229
See application file for complete search history.

(56) References Cited

U.S. PATENT DOCUMENTS

| | | |
|---|---|---|
| 3,063,670 A | 11/1962 | Young |
| 3,575,475 A | 4/1971 | Boerner |
| 3,700,289 A | 10/1972 | Bilinski et al. |
| 4,799,561 A * | 1/1989 | Komoto ....................... 177/229 |
| 5,771,986 A | 6/1998 | Kohn et al. |
| 2002/0038729 A1 | 4/2002 | Watabiki et al. |

FOREIGN PATENT DOCUMENTS

| | | |
|---|---|---|
| DE | 26 26 800 | 12/1977 |
| DE | 28 34 379 A1 | 2/1979 |

(Continued)

OTHER PUBLICATIONS metNFO, Zeitschrift für Metrologie (Journal of Metrology), vol. 10, Jan. 2003, Swiss Federal Office of Metrology and Accreditation, Lindenweg, Switzerland, pp. 1-24.

*Primary Examiner*—Randy W Gibson
(74) *Attorney, Agent, or Firm*—Sughrue Mion, PLLC

(57) ABSTRACT

A weighing system having a base region (1), a parallel-guided load receiver (4), at least one transmission lever (2) that is pivotably mounted on the base region via at least one flexural pivot (3), and a coupling element (7) that connects the load sensor to the short lever arm of the transmission lever. The flexural pivot (3), at least one part of the transmission lever (2), and at least one part of the base region (1') are monolithically formed from a block. The flexural pivot (3) is separated from the rest of the block by four horizontal parallel bores (31, 32, 33, 34) that are adjacently arranged in an annular manner in such a way as to respectively leave a thin connecting segment (36, 37, 38 39) between adjacent bores, and by additional slots. In this way, a hysteresis-free flexural pivot can be created without the need for separate assembly components.

9 Claims, 4 Drawing Sheets

FOREIGN PATENT DOCUMENTS

| | | |
|---|---|---|
| DE | 81 35 182 U1 | 4/1982 |
| DE | 36 18 663 C2 | 12/1986 |
| DE | 88 03 728 U1 | 8/1989 |
| DE | 43 05 425 A1 | 8/1994 |
| DE | 295 09 829 U1 | 11/1995 |
| DE | 199 23 208 C1 | 10/2000 |
| EP | 0 424 773 B1 | 1/1994 |
| EP | 1 400 776 A1 | 3/2004 |
| GB | 743 764 A | 1/1956 |
| GB | 21 11 228 A | 6/1983 |

* cited by examiner

US 7,534,971 B2

WEIGHING SYSTEM OF MONOLITHIC CONSTRUCTION INCLUDING FLEXURAL PIVOT

This is a Continuation of International Application PCT/EP2006/000831, with an international filing date of Feb. 1, 2006, which was published under PCT Article 21(2) in German, and the disclosure of which is incorporated into this application by reference.

FIELD AND BACKGROUND OF THE INVENTION

The invention relates to a weighing system having a base region, a parallel-guided load receiver, at least one transmission lever that is pivotably mounted on the base region by means of at least one flexural pivot, and a coupling element that connects the load receiver to the short lever arm of the transmission lever.

Weighing systems of this kind are conventional in the art and are described, for example, in German Utility Model DE-Gbm 81 35 182.

A disadvantage of this known weighing system is that the complexity of assembly and calibration of the flexural pivot constructed of individual leaf springs is relatively high and securing the leaf springs to the transmission lever and the base region can deform the flexural pivot, thereby causing hysteresis effects, drift and poor long-term consistency.

To alleviate this problem, U.S. Pat. No. 3,700,289 proposes to configure a universal joint in such a way that the horizontal spring connecting segments of the flexural pivot are produced by means of bores in an outer tubular member and the vertical spring connecting segments are similarly produced in an inner tubular member.

In this manner the flexural pivots are created as the two tubular members are concentrically assembled. Here too, however, the production and assembly complexity is high because the crossing points of the horizontal and the vertical spring connecting segments must be aligned very precisely to each other so as to avoid any constraining forces during pivoting.

Furthermore, U.S. Pat. No. 3,063,670 proposes to form a flexural pivot with one vertical and two horizontal leaf springs from a cubical block by milling. This, however, requires path milling from four different directions with a relatively high machining volume so that production is time consuming.

OBJECT OF THE INVENTION

It is therefore an object of the invention to provide an improved flexural pivot for a weighing system of the above-described type, which is simple to manufacture and, to the extent possible, shows no hysteresis.

SUMMARY OF THE INVENTION

According to one formulation of the invention, this object is attained by a weighing system having a base region, a parallel-guided load receiver, at least one transmission lever that is pivotably mounted on the base region by at least one flexural pivot, and a coupling element that connects the load receiver to the short lever arm of the transmission lever. The flexural pivot, at least one part of the transmission lever and at least one part of the base region are monolithically formed from a block. The flexural pivot is created by four horizontal parallel bores, which are adjacently arranged in an annular manner in such a way as to respectively leave a thin connecting segment between adjacent bores, and is separated from the rest of the block by additional slots.

Because of the monolithic construction, the individual springs of the flexural pivot do not have to be screwed, welded or in some other way connected to the base region and the transmission lever. Rather, they are formed from the block by the four bores and the slots, so as to prevent from the outset the introduction of stresses during assembly.

The monolithic construction of the weighing system is already known per se from German Utility Model DE 295 09 829 U1 (corresponding to U.S. Pat. No. 5,771,986). In that design, however, no flexural pivots are provided for mounting the transmission lever but rather individual vertical springs. Individual springs are much easier to integrate monolithically because no crossing points of spring elements occur there. The cited utility model contains no reference to a monolithic construction of flexural pivots. Furthermore with regard to transport safety of the weighing systems, individual springs are much more critical than cross-shaped springs, so that they often cannot replace flexural pivots.

Advantageous embodiments are set forth in the dependent claims.

BRIEF DESCRIPTION OF THE DRAWINGS

Specific embodiments will now be described in greater detail with reference to the schematic drawings, in which.

DETAILED DESCRIPTION OF PREFERRED EMBODIMENTS

Figure 1:
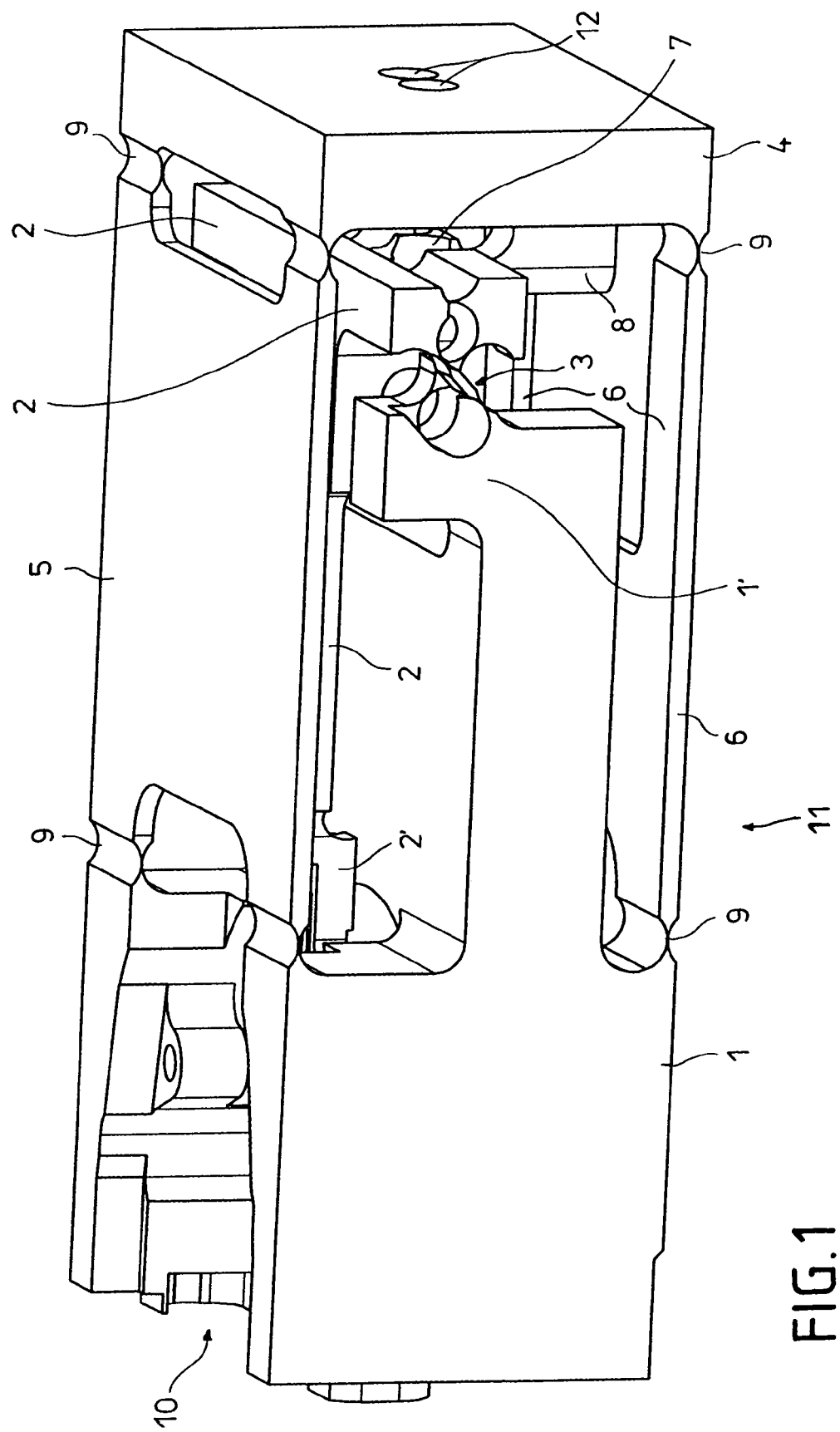
FIG. 1 shows a weighing system in a perspective view.

The weighing system 11 depicted in a perspective view in FIG. 1 has a base region 1 that is fixed to the housing and a load receiver 4 that is connected to the base region so as to be vertically movable by an upper guide 5 and a lower guide 6 in the form of a parallel guide unit. The thin material points acting as linkage points are identified as 9. The weight force of the material being weighed, which is applied to the load receiver 4 and introduced at the bores 12, for example, is transmitted to the short lever arm of a transmission lever 2 via a projection 8 and a coupling element 7, which is only partially visible in FIG. 1. The transmission lever 2 is pivotably mounted on a protruding part 1' of the base region 1 by means of a flexural pivot 3. The coil, which is not visible in FIG. 1, is secured to the long lever arm 2' of the transmission lever 2. This coil protrudes into the air gap of a permanent magnet system, not depicted in the drawing, which can be mounted within the clearance 10 on the base region 1. The construction of the flexural pivot 3 will now be explained with reference to FIGS. 2 to 4, 5 to 6, 7, and 8 to 10. The construction and function of the remaining parts of the weighing system are generally known, so that they do not need to be explained in greater detail.

Figure 2:
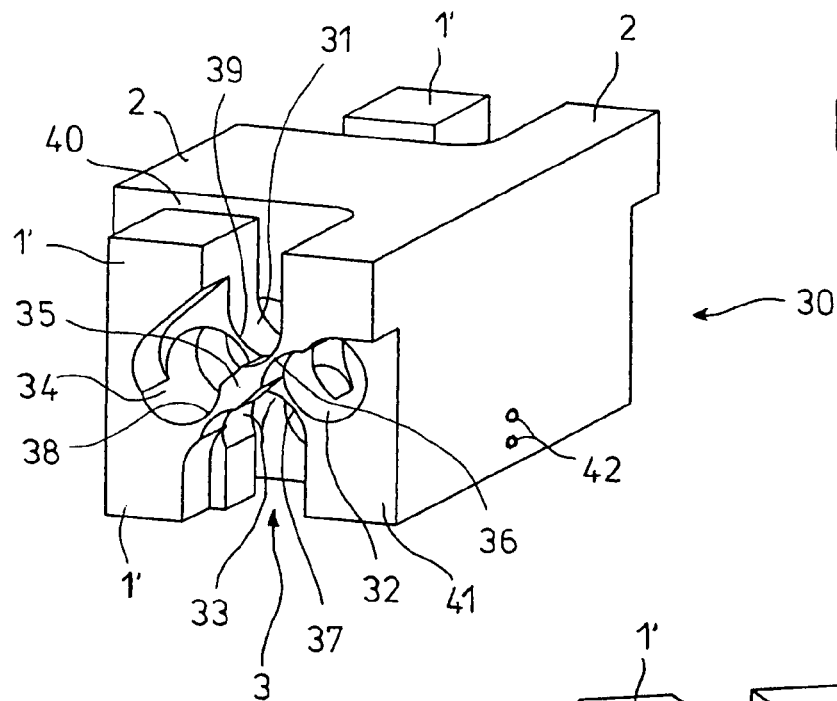
FIG. 2 shows a first embodiment of the parts of the weighing system that are essential to the invention in a perspective view.
Figure 3:
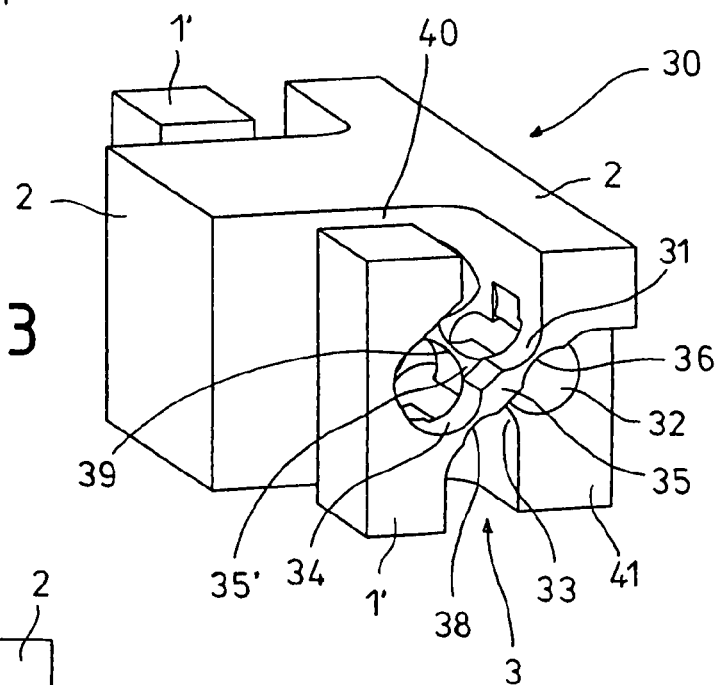
FIG. 3 shows the embodiment depicted in FIG. 2 from a different angle in a perspective view.
Figure 4:
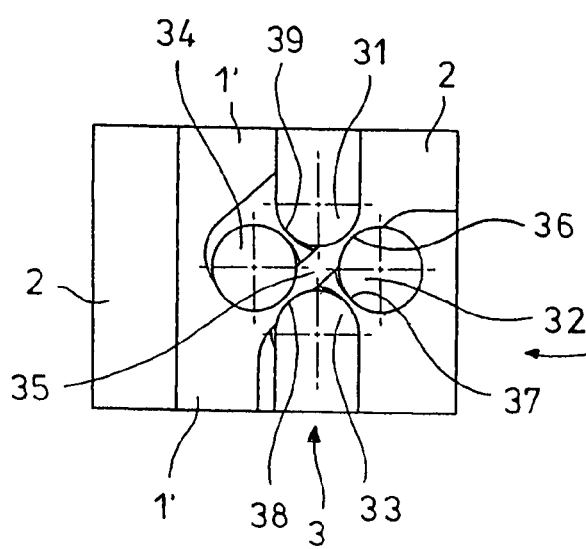
FIG. 4 shows the embodiment depicted in FIGS. 2 and 3 in a side elevation.

FIGS. 2 to 4 show the flexural pivot in a first embodiment. FIGS. 2 and 3 are perspective views from two different angles while FIG. 4 is a side elevation. The figures show that the flexural pivot 3 is essentially formed from the material block 30 by four horizontal bores 31, 32, 33 and 34 with the same diameter. In FIG. 4 the center points of these bores are suggested by thin coordinate axes. These center points are located in the corners of a square standing on one tip. The bore 31 is expanded upwardly to an opening in the region of the flexural pivot. The bore 33 is similarly expanded downwardly to an opening. Between the four bores initially remains a cross-shaped inner part 35/35' that is connected to the rest of the block 30 by four thin connecting segments 36, 37, 38 and 39. In a next production step, the flexural pivot 3 is separated from the transmission lever 2 by a vertical slot 40 and divided into two partial areas by another vertical slot, whose rear boundary 41 is visible in FIGS. 2 and 3. Subsequently two opposite connecting segments are milled off on the cross-shaped inner part 35 in the partial area lying in front, as seen in the figures, so that the inner part is connected to the rest of the block only by the connecting segments 36 and 38. Correspondingly, in the rear area, as seen in the figures, two opposite connecting segments are milled off on the cross-shaped inner part 35', so that the rear inner part is connected to the rest of the block only by the connecting segments 37 and 39.

In the described manner, two separate crosswise-arranged spring elements are formed, namely the spring element 36/35/38 in front, as seen in the figures, with the connecting segments 36 and 38 as the thin points of the spring joint and the spring element 37/35'/39 in the rear, as seen in the figures, with the connecting segments 37 and 39 as the thin points of the spring joint. The two spring elements together form the flexural pivot 3.

The geometry of the flexural pivot has been described above with reference to a production sequence for better understanding. However, this sequence is only one of various possible ways to produce the structure of the monolithic flexural pivot according to the invention.

It should be noted that four connecting segments are produced by the four horizontal bores, two of which are removed and two are used for each spring element. This makes it possible in the first place to produce the flexural pivot monolithically at reasonable cost. The construction of each spring element from two thin connecting segments, which act as linkage points, furthermore makes the flexural pivot less sensitive to machining tolerances because a total of four linkage points more easily compensate any machining variances during the movement of the flexural pivot.

In FIGS. 2 to 4 a flexural pivot is produced not only in the front region of the material block 30, but two crosswise-arranged spring elements are correspondingly produced in the rear region of the block behind the transmission lever 2. This divides the material block 30 into a base region 1' and a transmission lever 2, which can be pivotably interconnected by two flexural pivots.

The material block 30 described with reference to FIGS. 2 to 4 is either used as a part of a weighing system by screwing the base region 1' to the base region 1 of the weighing system, completing the transmission lever 2 with a long lever arm 2' and screwing a coupling element to the short lever arm (two fastening holes 42 are schematically indicated in FIG. 2 for this purpose), or the material block 30 is not manufactured as a separate block but is formed from a single larger block together with the remaining parts of the weighing system, as already depicted in FIG. 1.

Figure 5:
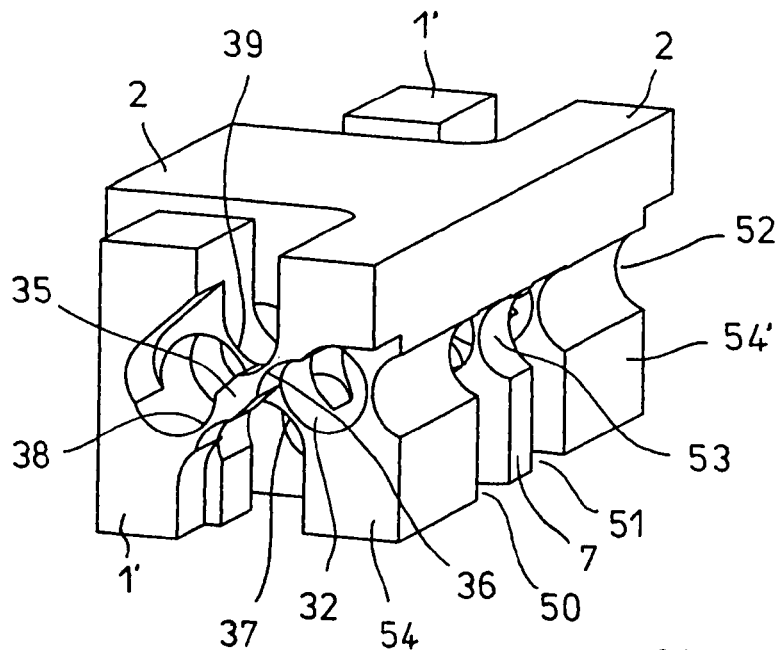
FIG. 5 shows a second embodiment of the parts of the weighing system that are essential to the invention in a perspective view.
Figure 6:
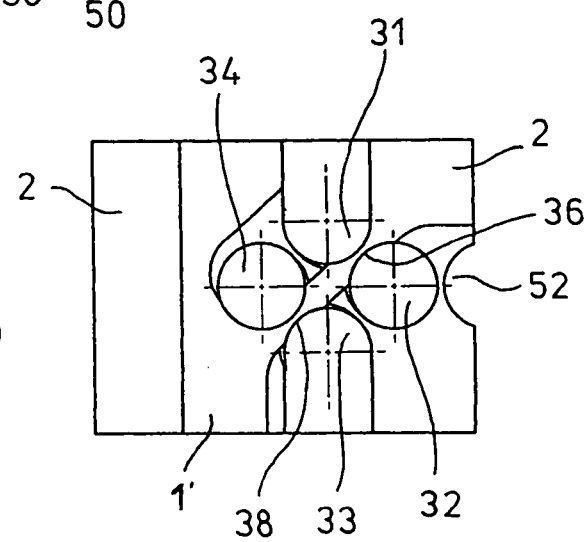
FIG. 6 shows the embodiment depicted in FIG. 5 in a side elevation.

One advantageous embodiment in which the upper thin point of the coupling element can be produced together with the flexural pivot is shown in FIGS. 5 and 6. FIG. 5 is a perspective view, the viewing angle of which corresponds to that of FIG. 2. FIG. 6 is a side elevation. Parts that are the same as those shown in FIGS. 2 to 4 are identified by the same reference numerals and will not be explained again here. The embodiment depicted in FIGS. 5 and 6 has two additional slots 50 and 51 and an additional bore/milled recess 52. The two slots 50 and 51 separate the upper part of the coupling element 7 from the transmission lever 2. The bore/milled recess 52 together with the bore 32 required for the flexural pivot forms the upper thin linkage point 53 for the coupling element. The slots 50 and 51 are only deep enough that the lower parts 54 and 54' of the transmission lever 2 remain stably connected to the main part of the transmission lever, which is not evident from the figures, however.

This embodiment depicted in FIGS. 5 and 6 can now be easily completed to form an entire monolithic weighing system, which—with the exception of the coil and the permanent magnet system—can be formed completely from a single block. The weighing system 11 shown in FIG. 1 has such a monolithic construction.

Figure 7:
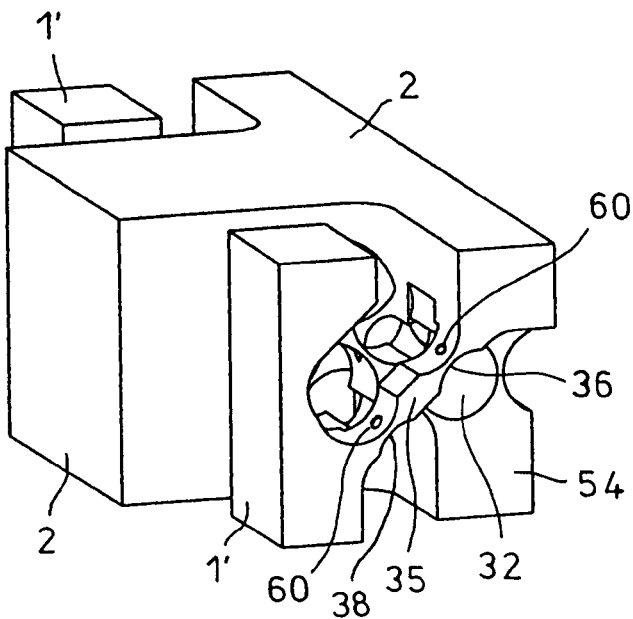
FIG. 7 shows a third embodiment of the parts of the weighing system that are essential to the invention in a perspective view.

FIG. 7 shows yet another embodiment. Parts that are the same as those in the embodiment depicted in FIGS. 5 and 6 are again identified by the same reference numerals and will not be re-explained here. The embodiment depicted in FIG. 7 differs only by additional recesses 60 in the connecting segments 36, 37, 38 and 39. These recesses are produced by boring from the top and are arranged in such a way that they do not contact the edge of the connecting segments. Thus they reduce the spring constant of the flexural pivot without substantially reducing its stability.

Figure 8:
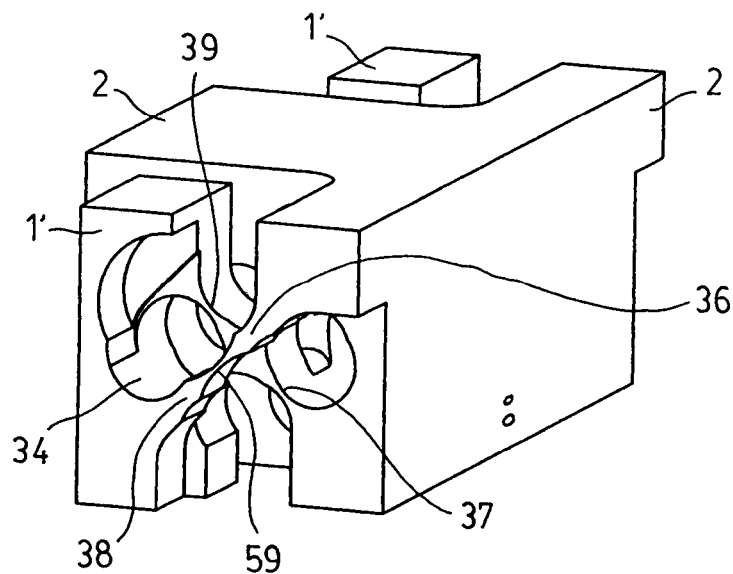
FIG. 8 shows a fourth embodiment of the parts of the weighing system that are essential to the invention in a perspective view.
Figure 9:
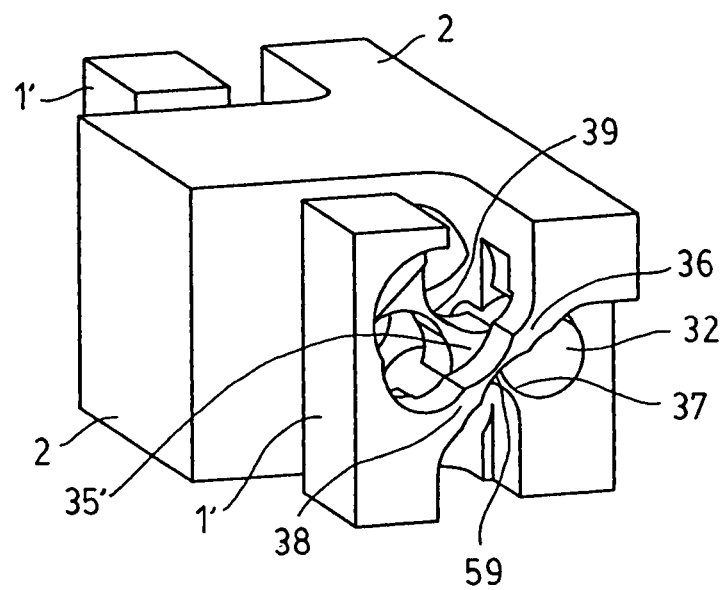
FIG. 9 shows the embodiment depicted in FIG. 8 from a different angle in a perspective view.
Figure 10:
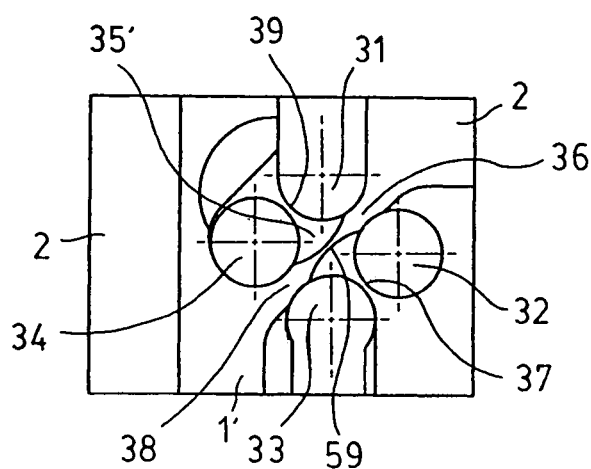
FIG. 10 shows the embodiment depicted in FIGS. 8 and 9 in a side elevation.

FIGS. 8 to 10 show a fourth embodiment. The representation corresponds to that of FIGS. 2 to 4: FIGS. 8 and 9 are perspective views from two different angles. FIG. 10 is a side elevation. Parts that are the same as those depicted in FIGS. 2 to 4 are again identified by the same reference numbers and will not be re-explained here. In the embodiment shown in FIGS. 8 to 10, the center points of the bores 31 to 34 are not situated in the corners of a square but in the corners of a rectangle with unequal sides. This is best seen in FIG. 10: the distance between the bores 31 and 34 as well as 32 and 33 is smaller than the distance between the bores 31 and 32 as well as 34 and 33. The connecting segments 36 and 38 are therefore thicker than the connecting segments 37 and 39. The thinner connecting segments 37 and 39 act as linkages in the manner described above with reference to other embodiments. The thicker connecting segments 36 and 38 are clearly more stable, and the actual linkage between them is produced by an additional thin material point 59. Since this thin material point 59 is formed only in the spring element located in front as seen in the figures it is easily formed from the block. In the rear spring element with the connecting segments 37 and 39 it would be practically impossible to produce such a central thin material point. This embodiment with the two connecting segments 37 and 39 as linkages in the rear spring element and the thin material point 59 as the only linkage in the front spring element has the advantage that the kinematic center of rotation of the flexural pivot can be defined more precisely in at least one direction. This flexural pivot therefore behaves similarly to the conventional non-monolithic flexural pivots in which the thin points of the two spring elements are located directly at the crossing point (as in the previously cited U.S. Pat. No. 3,700,289, for example). This is particularly advantageous if the two spring elements of the flexural pivot are not disposed at a +/−45° angle to the horizontal—as in the examples shown here—but are instead disposed horizontally and vertically.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A weighing system comprising:
    a base region,
    a parallel-guided load receiver,
    at least one transmission lever pivotably mounted on the base region with at least one flexural pivot, and
    a coupling element connecting the load receiver to a short lever arm of the transmission lever,
    wherein the flexural pivot, at least one part of the transmission lever and at least one part of the base region are monolithically formed from a block, and the flexural pivot is formed by four horizontal, mutually parallel, annular bores adjacently arranged to form respective connecting segments between at least some of the adjacent bores.

2. The weighing system as claimed in claim 1, wherein the center points of the four bores are arranged in the corners of a square, the bores have the same diameter, and the length of the sides of the square exceeds the diameter of the bores by the thickness of a respective one of the connecting segments.

3. The weighing system as claimed in claim 2, wherein the sides of the square formed by the center points of the four bores are at respective 45° angles to the horizontal.

4. The weighing system as claimed in claim 1, wherein the connecting segments are divided by at least one vertical slot into at least two partial regions arranged adjacently in axial direction of the bores, and in each partial region two opposing connecting segments are severed from the block by at least one slot, such that two remaining opposing connecting segments form a respective spring element, and wherein the respective spring elements of the adjacent partial regions are arranged crosswise.

5. The weighing system as claimed in claim 4, wherein the flexural pivot comprises two pairs of spring elements, and wherein one of the pairs is spaced apart from the other of the pairs in axial direction of the bores.

6. The weighing system as claimed in claim 1, wherein the connecting segments are weakened by recesses that do not contact vertical edges of the connecting segments.

7. The weighing system as claimed in claim 1, wherein, in addition to the base region, the transmission lever and the flexural pivot, the load receiver, guides of a parallel guide unit and the coupling element are monolithically formed from the block.

8. The weighing system as claimed in claim 7, wherein one of the four horizontal bores for the flexural pivot additionally delimits a thin point of the coupling element.

9. The weighing system as claimed in claim 1, wherein a slot separates the transmission lever from the base region in an area adjoining the flexural pivot.

* * * * *